United States Patent [19]

Leen

[11] Patent Number: 5,448,463

[45] Date of Patent: Sep. 5, 1995

[54] HALOGEN CLAMP LIGHT

[75] Inventor: Monte A. Leen, Bellevue, Wash.

[73] Assignee: Leen & Associates, Inc., Bellevue, Wash.

[21] Appl. No.: 98,430

[22] Filed: Jul. 28, 1993

Related U.S. Application Data

[63] Continuation-in-part of Ser. No. 10,080, Jun. 28, 1993, Pat. No. Des. 348,743.

[51] Int. Cl.⁶ .................................................... F21V 21/08
[52] U.S. Cl. ................................ 362/396; 362/263; 362/376; 362/394; 362/413; 362/427
[58] Field of Search ............... 362/376, 336, 413, 427, 362/263, 394, 395, 265, 414

[56] References Cited

U.S. PATENT DOCUMENTS

| D. 141,063 | 5/1945 | Kiplock . | |
|---|---|---|---|
| D. 158,904 | 6/1950 | Smith . | |
| D. 251,751 | 5/1979 | Lawrence et al. . | |
| D. 287,644 | 1/1987 | Gierke . | |
| D. 289,929 | 5/1987 | Langlands . | |
| 1,606,219 | 11/1926 | Havens . | |
| 2,085,683 | 6/1937 | McGill . | |
| 2,569,068 | 9/1951 | Maxwell . | |
| 3,851,166 | 11/1974 | Kohler | 362/396 |
| 3,872,428 | 3/1975 | Boisvert . | |
| 4,236,195 | 11/1980 | Kovacik . | |
| 4,288,848 | 9/1981 | Fido | 362/396 |
| 4,630,185 | 12/1986 | Copeland | 362/427 |
| 4,639,842 | 1/1987 | Upchorch . | |
| 4,678,153 | 7/1987 | Maddock et al. . | |
| 4,985,817 | 1/1991 | Yale . | |
| 5,034,865 | 7/1991 | Sonneman | 362/226 |
| 5,050,054 | 9/1991 | Hsu | 362/413 |
| 5,163,751 | 11/1992 | Bottiglleri . | |
| 5,195,823 | 3/1993 | Sidabras . | |
| 5,205,645 | 4/1993 | Lee | 362/427 |
| 5,209,562 | 5/1993 | Glassford | 362/396 |
| 5,222,806 | 6/1993 | Roberts, III | 362/427 |

OTHER PUBLICATIONS

Photograph and drawing of Ranger Enterprises product.

Primary Examiner—Stephen F. Husar
Assistant Examiner—Alan B. Cariaso
Attorney, Agent, or Firm—Christensen, O'Connor, Johnson & Kindness

[57] ABSTRACT

A halogen clamp light (11) comprising a halogen light (13) adjustably attached to one end of a rigid, elongate support (17) is disclosed. The halogen light (13) includes a housing (19), a halogen bulb (37), a reflector (35), a glass lens (29), and a protective grill (31, 33). A spring-loaded clamp is attached to the other end of the elongate support. The elongate support (17) includes a cavity that houses an on-off switch (71). The adjustable attachment includes a threaded shaft (53) that extends through a flange (41) that protrudes rearwardly from the housing (19). A manually adjustable locking nut (63) clamps the flange (41) to the elongate support (17) after the housing is adjusted to the desired position. A plastic bushing (55) is located between the flange (41) and the elongate support (17). Further, a hook (99) extends longitudinally outwardly from the cavity end of the elongate support (17).

18 Claims, 4 Drawing Sheets

HALOGEN CLAMP LIGHT

This application is a continuation-in-part of Ser. No. 29/10,080, filed Jun. 28, 1993, now U.S. Design Pat. No. 348,743, the subject matter of which is incorporated herein by reference.

TECHNICAL AREA

This invention relates to portable lights and, more particularly, to portable work lights.

BACKGROUND OF THE INVENTION

In the past, a wide variety of portable lights, particularly portable work lights, have been developed. Prior portable lights vary from relatively large halogen lights mounted on tripods to relatively small trouble lights that use incandescent bulbs. Large halogen work lights are unsuitable for use in many environments. While desirable in some environments, the intensity of the light produced by large halogen work lights can be overpowering in confined quarters. Moreover, the large "head" of large halogen work lights make them unsuitable for use in many environments. As a result, large halogen work lights are generally unsuitable for use as trouble lights, workbench lights, automobile repair working lights, etc. The most common portable light used in such environments is a conventional trouble light, which comprises an incandescent bulb mounted in a socket surrounded by a protective housing. One side of the housing includes a screen that can be rotated open or removed to replace the bulb. Extending outwardly from one end of the housing is a grounded cord. Extending outwardly from the other end of the housing is a hook for hanging the light from a suitable support. Some alternative portable lights have included a clamp and a relatively large reflector that surrounds an incandescent bulb. Because the clamp mechanisms have been weak, they have not been entirely satisfactory. Further, the large reflector makes such lamps undesirable for use in many circumstances.

The present invention is directed to providing a halogen light that, while being portable, overcomes both the large size disadvantages of prior art halogen work lights and the mounting and other disadvantages of incandescent trouble lights.

SUMMARY OF THE INVENTION

In accordance with this invention, a halogen clamp light is provided. The halogen clamp light comprises a halogen light adjustably attached to one end of a rigid, elongate support. The halogen light includes a housing, a halogen bulb, a reflector, a lens, and a protective grill. A spring-loaded clamp is attached to the other end of the elongate support. The elongate support includes a cavity that houses an on-off switch. The adjustable attachment includes a manually adjustable locking mechanism that clamps a flange that extends outwardly from the rear of the housing to the elongate support after the housing is swiveled to a desired position.

In accordance with other aspects of this invention, the manually adjustable locking mechanism includes a threaded shaft that extends outwardly from the elongate support, through the flange that extends rearwardly from the lamp housing. A manually adjustable locking nut that is mounted on the threaded shaft clamps the flange to the elongate support.

In accordance with other aspects of this invention, a plastic bushing is located between the flange and the elongate support.

In accordance with still further aspects of this invention, a hook extends longitudinally outwardly from the end of the elongate support that is attached to the housing.

In accordance with yet other aspects of this invention, the spring-loaded clamp comprises a pair of arms that are hinged together and a spring that forces one end of the arms together to create a pair of jaws. One arm, remote from the jaw end, is attached to the elongate support. When the other arm is moved toward the elongate support arm, the spring is compressed, causing the jaws to open.

As will be readily appreciated from the foregoing description, the invention provides a halogen clamp light that overcomes the disadvantages of both large halogen work lights and small incandescent trouble lights. Preferably, the halogen bulb housing has an intensity falling in the 100–200 watt range and the size of the housing is roughly the same as the size of the protective housing of an incandescent trouble light. Hence, relatively high-intensity light is provided, albeit in a small size. The support for the halogen light housing is relatively uncomplicated, comprising a rigid, elongate support that includes a switch cavity and a mechanism for adjustably attaching the housing to one end of the rigid, elongate support. A relatively uncomplicated jaw-type clamp mechanism located at the other end of the elongate support provides a strong gripping force. The hook allows the halogen clamp light to be hung from a suitable support when this is desirable. As a result, the invention includes all of the features and advantages of conventional incandescent trouble lights, plus all of the advantages of halogen work lights, minus many of the disadvantages of such lights.

BRIEF DESCRIPTION OF THE DRAWINGS

The foregoing features and other advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
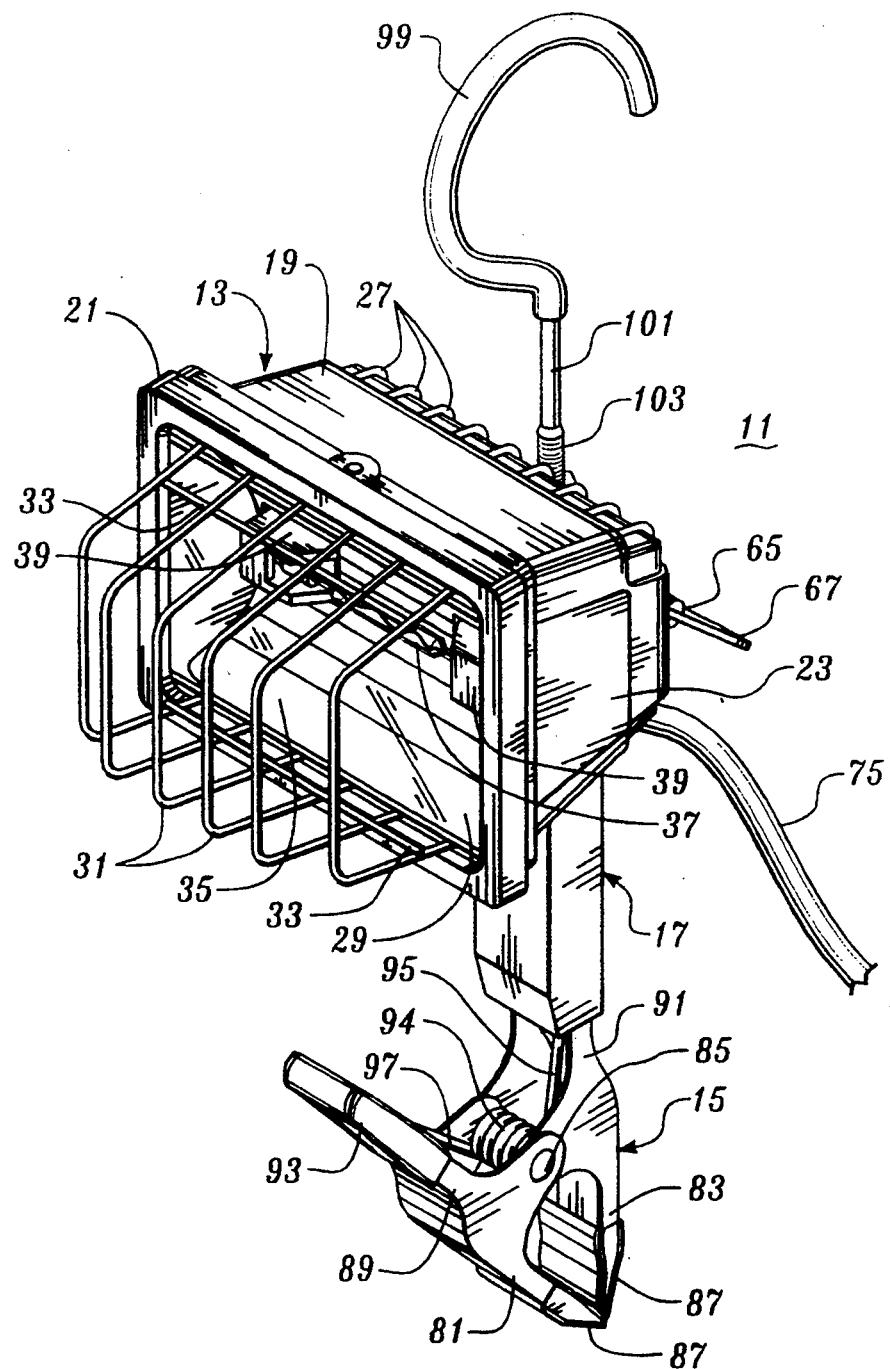
FIG. 1 is an isometric view of a preferred embodiment of the present invention.
Figure 2:
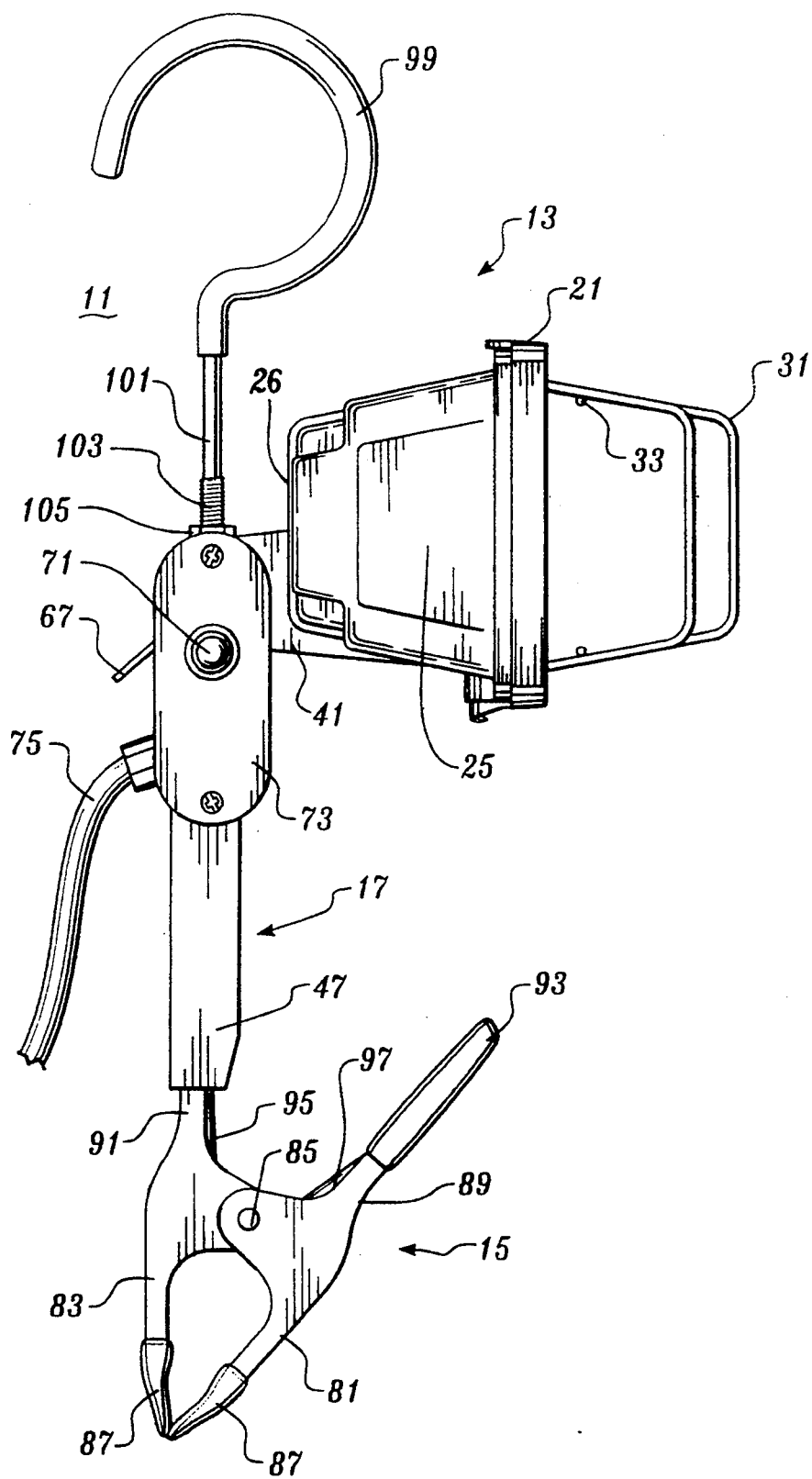
FIG. 2 is an elevational view of one side of the embodiment of the invention illustrated in FIG. 1.
Figure 3:
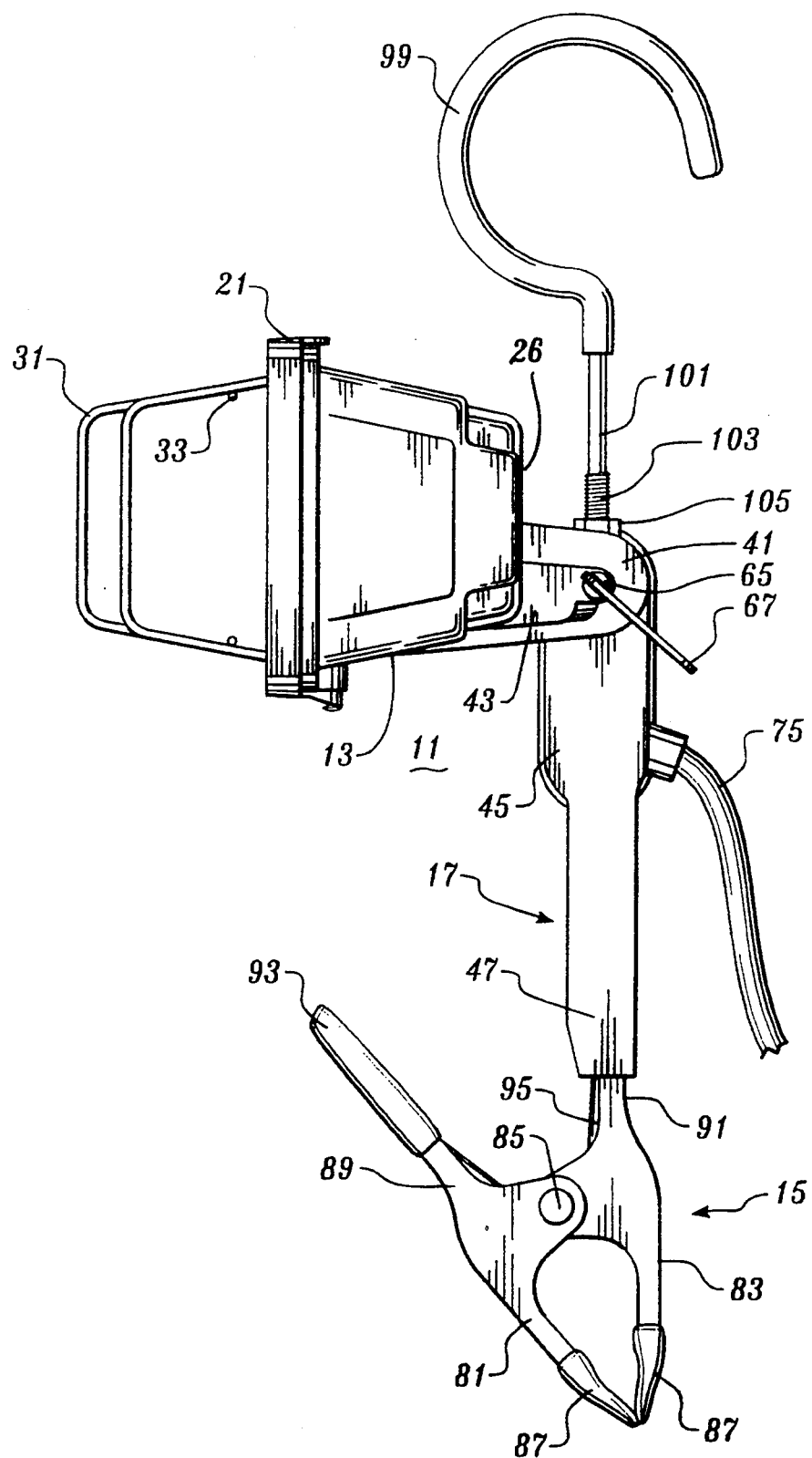
FIG. 3 is an elevational view of the other side of the embodiment of the invention illustrated in FIG. 1.

As shown in FIGS. 1–3, the present invention is a halogen clamp light 11 that includes a halogen light 13, a clamp 15, and a rigid, elongate support 17. The halogen light 13 includes a housing 19 having a rectangular open face enclosed by a frame 21. The sides of the housing 23 and 25 have a generally trapezoidal shape and the rear wall 26 of the housing includes a plurality of decorative fins 27. The frame 21 encloses a lens, preferably in the form of a transparent glass plate 29. The frame 21 also supports a protective grill comprising a plurality of trapezoidal-shaped wire frame elements 31 and cross members 33. Mounted in the housing behind the glass plate 29 is a reflector 35. Mounted in the center of the reflector 35 is a halogen bulb 37 supported by a pair of terminals mounted in ceramic housings 39. Preferably, the reflector 35 is formed of highly reflective sheet metal.

A flange 41 extends outwardly from the rear wall 26 of the housing 13. The flange 41 includes a protuberance 43 that includes a cavity for the wires that supply power to the halogen bulb 37. The elongate support 17 includes a large oval-shaped cavity 45 located at one end on arm 47. As shown, the longitudinal axis of the oval-shaped cavity and the longitudinal axis of the arm are coaxial. The flange 41 of the lamp 13 is affixed to the elongate support 17 at the end of the cavity 45 remote from the arm 47.

Figure 4:
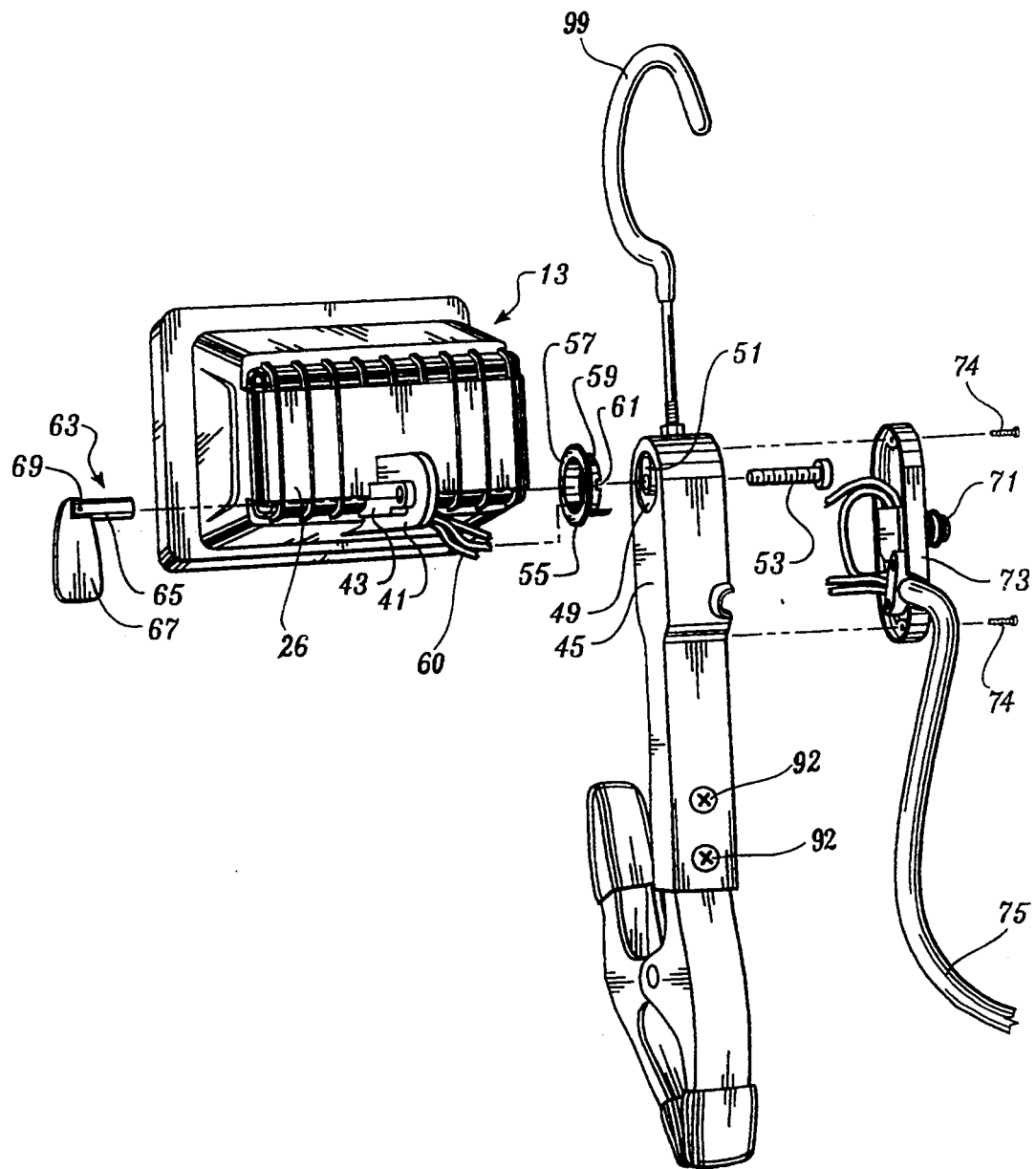
FIG. 4 is an exploded view of the mechanism for attaching the halogen light housing to the elongate support of the embodiment of the invention illustrated in FIGS. 1–3.

The flange/elongate support attachment mechanism is best illustrated in FIG. 4. As shown, the end of the oval-shaped cavity 45 to which the flange 41 is attached includes a hole 49. Mounted in the interior of the housing 45 is a protuberance 51. The protuberance 51 fills the upper portion of the hole 49. Passing through the protuberance 51 and extending outwardly is the threaded shaft of a bolt 53.

Located between the flange 41 of the housing 13 and the hole 49 is a nylon bushing 55. The nylon bushing includes a flange 57 that surrounds the hole 49 and lies between the outer surface of the cavity 45 and the flange 41. The nylon bushing also includes a collar 59 that extends inwardly and surrounds the periphery of the hole 49. Located in the side of the collar 59 is a slot 61. Wires from the lamp 60 pass through the center of the collar 59 and out through the slot 61.

Located on the side of the flange 41 remote from the collar 59 is a lock nut 63 that includes a threaded shaft 65 and a hinged arm 67. The hinged arm is pinned to the outer end of the threaded shaft 65 by a pin 69. Mounted in a cover plate 73 that encloses the side of the cavity 45 remote from the side attached to the flange 41 is a switch 71. In a conventional manner, the switch is connected to the wires 60 that run to the halogen bulb terminals. The cover plate 73 is attached to the cavity 45 by a pair of screws 74. A power cord 75 exits from the cavity 45 on the end remote from the end attached to the flange 41.

The clamp 15 comprises a pair of jaws 81 and 83 hingedly joined by a pin 85. The tips of the jaws are covered by protective sheathing preferably in the form of vinyl covers 87. Arms 89 and 91 that are integral with the jaws 81 and 83 extend outwardly from the remote side of the hinge pin 85. One of the arms 89 is enclosed by a vinyl cover 93. The other arm 91, in a coaxial manner, extends into a cavity in the end of the rigid, elongate support 17 remote from the oval-shaped cavity 45. The other arm 91 is affixed to the elongate support 17 by any suitable means, such as screws 92 that screw into threaded holes in the arm 91.

As best shown in FIG. 1, a coil spring 94 surrounds the pin 85. The coil spring includes outwardly projecting arms 95 and 97 that press against the jaw arms 89 and 91. The coil spring is oriented and sized such that it causes the jaws 81 and 83 to close against one another. When the arms 89 and 91 of the clamp 15 are moved toward one another, the jaws are forced open and the spring force increases.

As a result, when the clamp arms 89 and 91 are released, the jaws 81 and 83 apply a force to a support located between the jaws.

Extending outwardly from the end of the elongate support 17 to which the flange 41 of the housing 13 is attached is a hook 99. Preferably, the curved portion of the hook is covered with a vinyl coating. The hook terminates in a shaft 101 having a threaded end 103 that screws into a threaded hole in the upper end of the cavity 45. A lock nut 105 is provided to lock the hook to the upper end of the cavity 45 in a conventional manner.

As will be readily appreciated from the foregoing description, the invention provides a halogen clamp light that is relatively small in size, yet provides light equal to or greater than a conventional trouble light. In this regard, preferably, the size of the housing 13 is approximately the same as the size of a conventional incandescent trouble light. In one actual embodiment of the invention, the housing is approximately 5.5 inches wide, 4.2 inches high, and 3.2 inches deep. The amount of light emitted will, of course, be determined by the intensity of the halogen bulb. Presently, halogen bulbs in the 100-250 watt range have been found suitable depending upon the use to which the halogen clamp light is to be put. In most instances, a 100-watt bulb is adequate. The clamping mechanism, while relatively uncomplicated, provides a strong force that allows the halogen clamp light to be mounted in almost any position in a variety of locations. The swivel head allows the light to be aimed in the desired direction. Locking is easy and effective due to the use of a nylon bushing and a relatively uncomplicated clamping mechanism. Finally, the inclusion of a hook allows the halogen clamp light to be hung from a suitable support when necessary or desirable.

While a preferred embodiment of the invention has been illustrated and described, it is to be understood that, within the scope of the appended claims, various changes can be made therein.

The embodiments of the invention in which an exclusive property or privilege is claimed are defined as follows:

1. A halogen clamp light comprising:
    a) a halogen light including:
        i) an open-sided housing;
        ii) a reflector mounted in said housing facing the open side of said housing;
        iii) a halogen bulb mounted in said housing in front of said reflector, and
        iv) a light-passing lens enclosing the open side of said housing;
    b) a rigid, elongate support including a switch cavity located at one end;
    c) adjustable attachment means for attaching said halogen light housing directly to the end of said elongate support including said switch cavity;
    d) a switch electrically connected to said halogen bulb mounted in said switch cavity located in said elongate support; and
    e) a clamp formed of a pair of spring-loaded jaws movable between open and closed positions hingedly joined by a pin and a pair of arms integral with the jaws, one of said arms being attached to the end of said elongate support opposite the end to which said halogen light housing is adjustably attached, said relatively rigid, elongate support being of a length such that the regions where said arm of said clamp and said housing are attached to said rigid, elongate support are spaced apart by an amount substantially greater than the length of the arm of said clamp that is not attached to said rigid, elongate support.

2. A halogen clamp light as claimed in claim 1, wherein said adjustable attachment means includes:
   a flange extending outwardly from said halogen light housing, said flange including a hole;
   a threaded shaft affixed to said elongate support and extending outwardly therefrom, said threaded shaft passing through said hole in said flange; and
   a threaded locking mechanism mounted on said threaded shaft on the side of said flange opposite from the side facing said elongate support.

3. A halogen clamp light as claimed in claim 2, wherein said spring-loaded jaws include a coil spring surrounding said pin, said coil spring including outwardly extending spring arms that impinge on said arms that are integral with said pair of jaws.

4. A halogen clamp light as claimed in claim 3, wherein said halogen light includes a protective grill mounted on the side of said protective cover remote from said housing.

5. A halogen clamp light as claimed in claim 4, including a hook affixed to the end of said elongate support that is adjustably attached by said adjustable attachment means to said halogen light.

6. A halogen clamp light as claimed in claim 1, wherein said spring-loaded jaws include a coil spring surrounding said pin, said coil spring including outwardly extending spring arms that impinge on said arms that are integral with said pair of jaws.

7. A halogen clamp light as claimed in claim 6, wherein said halogen light includes a protective grill mounted on the side of said protective cover remote from said housing.

8. A halogen clamp light as claimed in claim 7, including a hook affixed to the end of said elongate support that is adjustably attached by said adjustable attachment means to said halogen light.

9. A halogen clamp light comprising:
   a) a halogen light including:
      i) an open-sided housing having a width of approximately 5.5 inches and a height of approximately 4.2 inches;
      ii) a reflector mounted in said housing facing the open side of said housing;
      iii) a halogen bulb having a watt value not greater than 250 watts mounted in said housing;
      iv) a light-passing lens enclosing the open side of said housing;
   b) a relatively rigid; support
   c) attachment means for attaching said open-sided housing to said relatively rigid support;
   d) a switch electrically connected to said halogen bulb for controlling the application of electric power to said halogen bulb; and
   e) a clamp formed of a pair of spring-loaded jaws hingedly joined by a pin movable between open and closed positions and a pair of arms integral with the jaws, one of said arms being attached to said relatively rigid support, said relatively rigid support being formed and said open-sided housing and said arm of said clamp being attached to said relatively rigid support such that the regions where said arm of said clamp and said housing are attached to said relatively rigid support are spaced apart by an amount substantially greater than the length of the arm of said clamp that is not attached to said relatively rigid support.

10. A halogen clamp light as claimed in claim 9 wherein said attachment means is adjustable and allows said open-sided housing and, thus, said halogen light to pivot about at least one axis.

11. A halogen clamp light as claimed in claim 10, wherein said adjustable attachment means includes:
    a flange extending outwardly from said halogen light housing, said flange including a hole;
    a treaded shaft affixed to said relatively rigid support and extending outwardly therefrom, said threaded shaft passing through said hole in said flange; and
    a threaded locking mechanism mounted on said threaded shaft on the side of said flange opposite the side facing said relatively rigid support.

12. A halogen clamp light as claimed in claim 10, wherein said spring-loaded jaws include a coil spring surrounding said pin, said coil spring including outwardly extending spring arms that impinge on said arms that are integral with said pair of jaws.

13. A halogen clamp light as claimed in claim 12; wherein said halogen light includes a protective grill mounted on the side of said protective cover remote from said housing.

14. A halogen clamp light as claimed in claim 13, including a hook affixed to the end of said relatively rigid support that is attached by said attachment means to said halogen light.

15. A halogen clamp light as claimed in claim 10, wherein said spring-loaded jaws include a coil spring surrounding said pin, said coil spring including outwardly extending spring arms that impinge on said arms that are integral with said pair of jaws.

16. A halogen clamp light as claimed in claim 15, wherein said halogen light includes a protective grill mounted on the side of said protective cover remote from said housing.

17. A halogen clamp light as claimed in claim 16, including a hook affixed to the end of said relatively rigid support that is attached by said attachment means to said halogen light.

18. The halogen clamp light claimed in claim 9, wherein said relatively rigid support includes a switch cavity and wherein said switch is located in said switch cavity.

* * * * *

UNITED STATES PATENT AND TRADEMARK OFFICE
CERTIFICATE OF CORRECTION

PATENT NO. : 5,448,463
DATED : September 5, 1995
INVENTOR(S) : M.A. Leen

It is certified that error appears in the above-indentified patent and that said Letters Patent is hereby corrected as shown below:

| COLUMN | LINE | |
|---|---|---|
| 5 | 12 | Before "the side" delete --from-- |
| (Claim 2, | line 10) | |
| 5 | 50 | "rigid; support" should read --rigid support--. |
| (Claim 9, | line 12) | |

Signed and Sealed this

Ninth Day of April, 1996

Attest:

BRUCE LEHMAN

Attesting Officer  Commissioner of Patents and Trademarks